(12) United States Patent
Kato et al.

(10) Patent No.: US 8,579,323 B2
(45) Date of Patent: Nov. 12, 2013

(54) CURTAIN AIRBAG SYSTEM

(75) Inventors: Hideki Kato, Nissin (JP); Yosuke Shimizu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/443,433

(22) Filed: Apr. 10, 2012

(65) Prior Publication Data

US 2012/0256401 A1 Oct. 11, 2012

(30) Foreign Application Priority Data

Apr. 11, 2011 (JP) ................................. 2011-087665

(51) Int. Cl.
*B60R 21/232* (2011.01)

(52) U.S. Cl.
USPC ..................................... 280/730.2; 280/729

(58) Field of Classification Search
USPC .............................. 280/729, 730.2
See application file for complete search history.

(56) References Cited

U.S. PATENT DOCUMENTS

| | | | |
|---|---|---|---|
| 3,510,150 A | 5/1970 | Wilfert | |
| 3,804,435 A | 4/1974 | See et al. | |
| 5,470,103 A | 11/1995 | Vaillancourt et al. | |
| 5,863,068 A | 1/1999 | Breed | |
| 6,565,118 B2 * | 5/2003 | Bakhsh et al. | 280/730.2 |
| 6,695,347 B2 * | 2/2004 | Sonnenberg et al. | 280/743.2 |
| 6,722,691 B1 | 4/2004 | Haland et al. | |
| 6,851,707 B2 * | 2/2005 | Bakhsh et al. | 280/730.2 |
| 7,325,826 B2 * | 2/2008 | Noguchi et al. | 280/730.2 |
| 7,762,578 B2 * | 7/2010 | Dix | 280/730.2 |
| 7,997,615 B2 | 8/2011 | Jang | |
| 2002/0180192 A1 * | 12/2002 | Tanase et al. | 280/730.2 |
| 2008/0129023 A1 | 6/2008 | Heigl et al. | |
| 2010/0013203 A1 * | 1/2010 | Mitchell et al. | 280/743.2 |
| 2010/0225097 A1 * | 9/2010 | Trovato et al. | 280/730.2 |
| 2012/0098240 A1 | 4/2012 | Kato et al. | |
| 2012/0126517 A1 | 5/2012 | Kato et al. | |
| 2012/0200069 A1 | 8/2012 | Kato et al. | |

(Continued)

FOREIGN PATENT DOCUMENTS

| | | |
|---|---|---|
| JP | 07-117605 A | 5/1995 |
| JP | 2000-006750 A | 1/2000 |

(Continued)

OTHER PUBLICATIONS

Final Office Action issued to U.S. Appl. No. 13/443,524 dated Jun. 13, 2013.

*Primary Examiner* — Joseph Rocca
*Assistant Examiner* — Darlene P Condra
(74) *Attorney, Agent, or Firm* — Gifford, Krass, Sprinkle, Anderson & Citkowski, P.C.

(57) ABSTRACT

A curtain air bag of a curtain airbag system includes a main chamber stored in a folded condition in a roof side portion that extends rearward from a front pillar, and a front auxiliary chamber formed integrally with the main chamber and stored in a folded condition in the roof side portion together with the main chamber. The main chamber is inflated with gas supplied thereto in the event of a side impact of a vehicle and rollover of the vehicle, to be deployed like a curtain downwardly of the vehicle. The front auxiliary chamber is inflated with gas supplied thereto at least in the event of rollover of the vehicle, to be deployed in front of the main chamber such that an upper portion of the front auxiliary chamber as seen in a side view overlaps the front pillar, and a lower portion thereof overlaps a front side door.

10 Claims, 4 Drawing Sheets

(56) References Cited

U.S. PATENT DOCUMENTS

| | | |
|---|---|---|
| 2012/0248751 A1 | 10/2012 | Kato et al. |
| 2012/0256402 A1 | 10/2012 | Kato et al. |

FOREIGN PATENT DOCUMENTS

| | | |
|---|---|---|
| JP | 2001-088650 A | 4/2001 |
| JP | 2002-534321 A | 10/2002 |
| JP | 2002-362280 A | 12/2002 |
| JP | 2004-256000 A | 9/2004 |
| JP | 2007-161163 A | 6/2007 |
| JP | 2007-161167 A | 6/2007 |
| JP | 2010-036795 A | 2/2010 |
| JP | 4481575 B | 6/2010 |
| JP | 2012-020674 A | 2/2012 |
| JP | 2012-020719 A | 2/2012 |
| JP | 2012-040963 A | 3/2012 |
| JP | 2012-062042 A | 3/2012 |

* cited by examiner

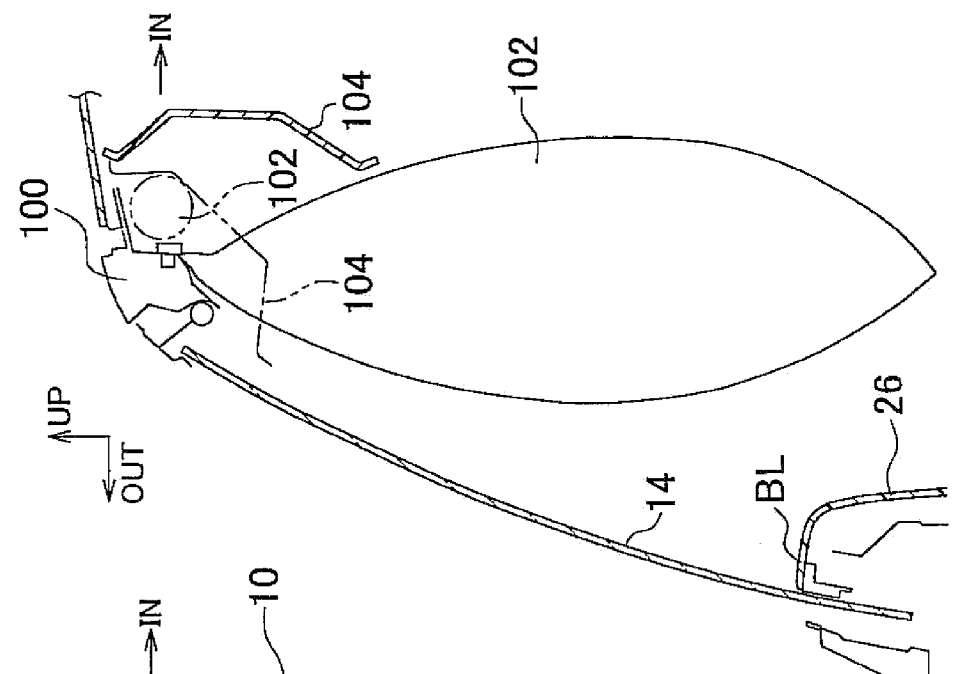
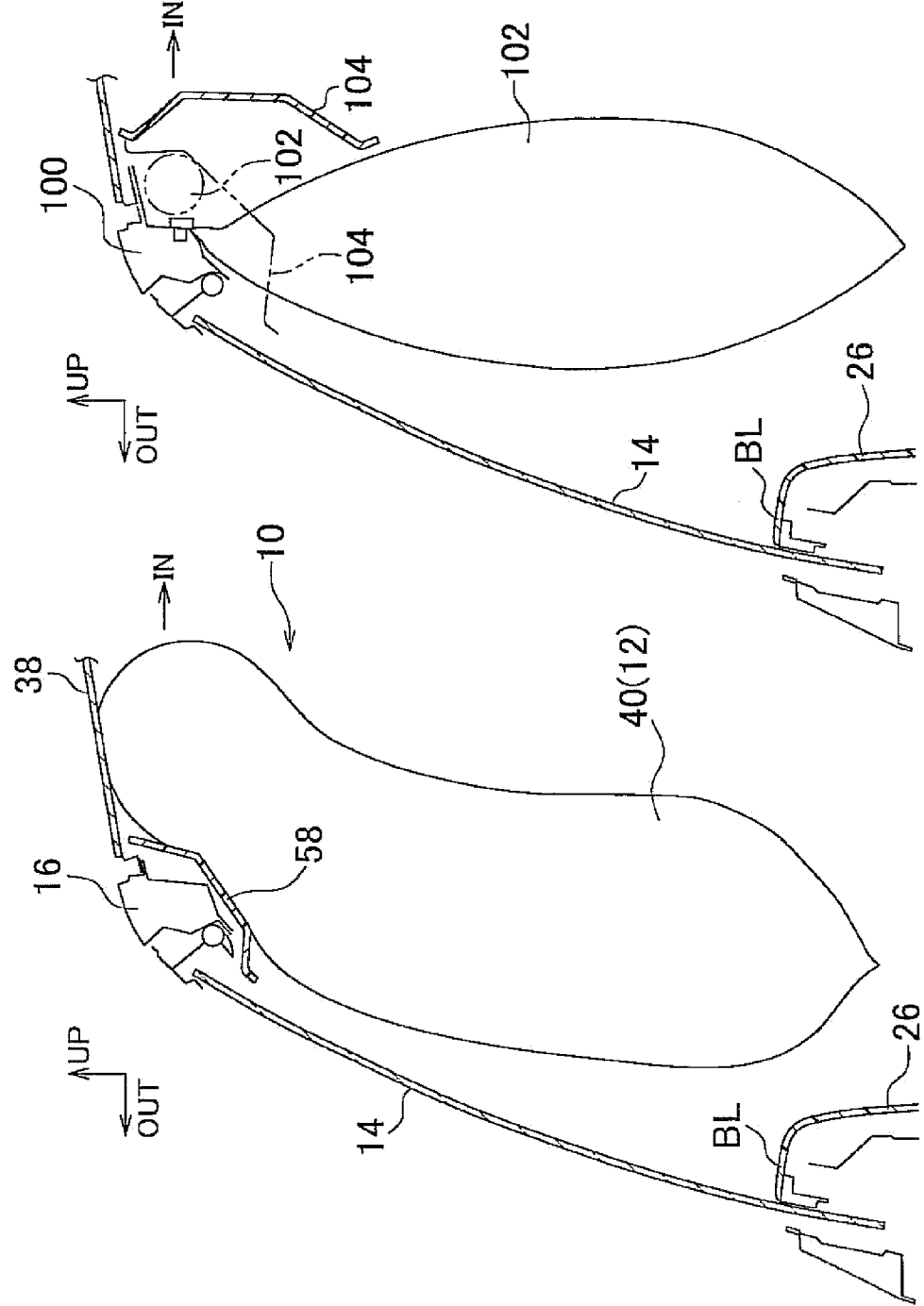

CURTAIN AIRBAG SYSTEM

CROSS REFERENCE TO RELATED APPLICATIONS

This application claims priority to Japanese Patent Application No. 2011-087665 filed on Apr. 11, 2011, which is incorporated herein by reference in its entirety including the specification, drawings and abstract.

BACKGROUND OF THE INVENTION

1. Field of the Invention

The invention relates to a curtain airbag system.

2. Description of Related Art

A curtain airbag system is known which includes a main inflatable portion provided at a seating location at which an occupant is seated, and an auxiliary inflatable portion that is constantly in fluid communication with the main inflatable portion via a reduced-diameter portion and is located off the occupant seating location (see, for example, Japanese Patent Application Publication No. 2007-161163 (JP 2007-161163 A)). It is also known to provide a curtain airbag with a second deployment portion that extends below the belt line, at a location other than the occupant seating location (see, for example, Japanese Patent Application Publication No. 2007-161167 (JP 2007-161167 A)). In a further known example of curtain airbag, an extended deployment portion that is deployed anterior to a roof side portion of the vehicle is folded back onto a first deployment portion, and the first deployment portion and the extended deployment portion are folded and stored in the roof side portion (see, for example, Japanese Patent No. 4481575).

In the systems as described in JP 2007-161163 A and JP 2007-161167 A, a front portion of the curtain airbag body is stored along the front pillar, which makes it difficult to use the curtain airbag system of this type in a vehicle having narrow front pillars. In the system as described in Japanese Patent No. 4481575, the extended deployment portion that is to be deployed in front of the roof side portion is small, and is not suitably used for protecting an occupant in a rollover event.

SUMMARY OF THE INVENTION

It is an object of the invention to provide a curtain airbag system that is suitably used in a vehicle having narrow front pillars and assures an improved occupant protection capability of protecting an occupant in the event of rollover of the vehicle.

A curtain airbag system according to a first aspect of the invention includes a curtain airbag stored in a folded condition in a roof side portion that extends rearward from a front pillar of the vehicle, wherein the curtain airbag includes a first deployment portion operable to be inflated with gas supplied thereto in the event of a side impact of a vehicle and rollover of the vehicle, to be deployed like a curtain downwardly of the vehicle, and a second deployment portion that is formed integrally with the first deployment portion. In this system, the second deployment portion is operable to be inflated with gas supplied thereto at least in the event of rollover of the vehicle, to be deployed in front of the first deployment portion such that an upper portion of the second deployment portion as seen in a side view overlaps the front pillar, and a lower portion thereof overlaps a side door.

In the curtain airbag system according to the first aspect of the invention, in the event of a side impact of the vehicle, at least the first deployment portion is deployed with gas supplied thereto, so as to protect the head of an occupant against the side impact. In the event of rollover of the vehicle, on the other hand, the first deployment portion and the second deployment portion are inflated and deployed with gas supplied thereto. The first deployment portion and second deployment portion, when inflated and deployed, restrict outward movement of the head of the occupant in the vehicle width direction, over a wide range in the longitudinal direction of the vehicle. Namely, the head of the occupant is protected in the rollover situation.

The curtain airbag system, in which the second deployment portion is stored in the roof side portion, can be more suitably used in a vehicle having thin or narrow front pillars, as compared with the arrangement in which the second deployment portion is stored in the front pillar. Also, during a rollover event, the upper portion and lower portion of the second deployment portion are deployed while overlapping the front pillar and the side door, respectively, as seen in a side view. Therefore, the reaction force developed at the second deployment portion for restricting outward movement of the head of the occupant in the vehicle width direction is securely supported by the front pillar and the side door (below the belt line). With this arrangement, the protection capability of protecting the head of the occupant in a rollover event is improved, in the second deployment portion that is provided in the roof side portion and not linked at its upper end to the front pillar.

Thus, the curtain airbag system according to the first aspect of the invention is suitably used in the vehicle having narrow front pillars, and assures improved occupant protection capability of protecting an occupant in a rollover event of the vehicle.

In the curtain airbag system according to the first aspect of the invention, the second deployment portion may be rolled or accordion-folded in a vertical direction together with the first deployment portion, and may be folded back onto the first deployment portion.

In the curtain airbag system as described above, the first deployment portion and second deployment portion as an integral body is rolled or accordion-folded in the vertical direction, and then the second deployment portion is folded back onto the first deployment portion while the first and second deployment portions are in the rolled or folded state. The folded-back second deployment portion that is in the rolled or accordion-folded state is located, for example, below or inside (as viewed in the vehicle width direction) the first deployment portion that is in the rolled or accordion-folded state.

In the curtain airbag system as described above, the second deployment portion may be adapted to be deployed in a cylindrical shape having a center axis that extends in a vertical direction of the vehicle, such that opposite end portions of the second deployment portion as viewed in the vertical direction of the vehicle respectively protrude upward and downward from opposite end portions of the first deployment portion as viewed in the vertical direction of the vehicle.

In the curtain airbag system as described above, the second deployment portion assumes a cylindrical shape that extends in the vertical direction of the vehicle; therefore, the above-mentioned reaction force can be effectively supported by the front pillar and side door which interfere with the second deployment portion, and the capability of protecting the head of the occupant is improved.

The curtain airbag system as described above may further include a thickness restricting portion that is provided between the first deployment portion and the second deployment portion, so as to restrict the thickness of the first deployment portion and the second deployment portion when deployed, and a strap having a front end engaged with the front pillar and a rear end connected to the thickness restricting portion. The strap may extend through an outer side, as viewed in a vehicle width direction, of the second deployment portion when deployed.

In the curtain airbag system as described above, when the first deployment portion and the second deployment portion are in their deployed conditions, tension is applied to the strap that connects the front pillar with the thickness restricting portion. Since the strap extends through the outer side of the second deployment portion as viewed in the vehicle width direction, the reaction force developed at the second deployment portion for restricting outward movement of the head of the occupant in the vehicle width direction is effectively supported by the strap. In this manner, the outward movement of the head of the occupant in the vehicle width direction is effectively restricted by the second deployment portion.

In the curtain airbag system as described above, the front end of the strap may be engaged with the front pillar while the rear end thereof may be connected to the thickness restricting portion, such that the strap extends through an outer side, as viewed in the vehicle width direction, of an impactor striking point of a rollover test in the second deployment portion.

In the curtain airbag system as described above, when the first deployment portion and the second deployment portion are in their deployed conditions, the strap passes the impactor striking point in the second deployment portion. Therefore, the outward movement of the head of the occupant in the vehicle width direction is further effectively restricted by the second deployment portion.

As explained above, the curtain airbag system according to the above aspect of the invention is suitably used in a vehicle having narrow front pillars, and assures an improved occupant protection capability of protecting an occupant in a rollover event of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A is an enlarged cross-sectional view of a front auxiliary chamber when deployed, which constitutes the curtain airbag system according to the embodiment of the invention;

FIG. 2B is an enlarged cross-sectional view of a front auxiliary chamber when deployed, which constitutes a curtain airbag system of a comparative example;

DETAILED DESCRIPTION OF EMBODIMENTS

A curtain airbag system 10 according to one embodiment of the invention will be described with reference to FIG. 1 through FIG. 4. Arrows FR, UP, IN and OUT denoted in FIG. 1-FIG. 4 as needed represent the front direction (travelling direction), upward direction, inward as viewed in the vehicle width direction, and outward as viewed in the vehicle width direction, respectively, of an automobile S equipped with the curtain airbag system 10. When longitudinal and vertical directions are referred to in the following description, they are supposed to represent the longitudinal direction and vertical direction of the vehicle, respectively, unless otherwise specified.

Figure 1:
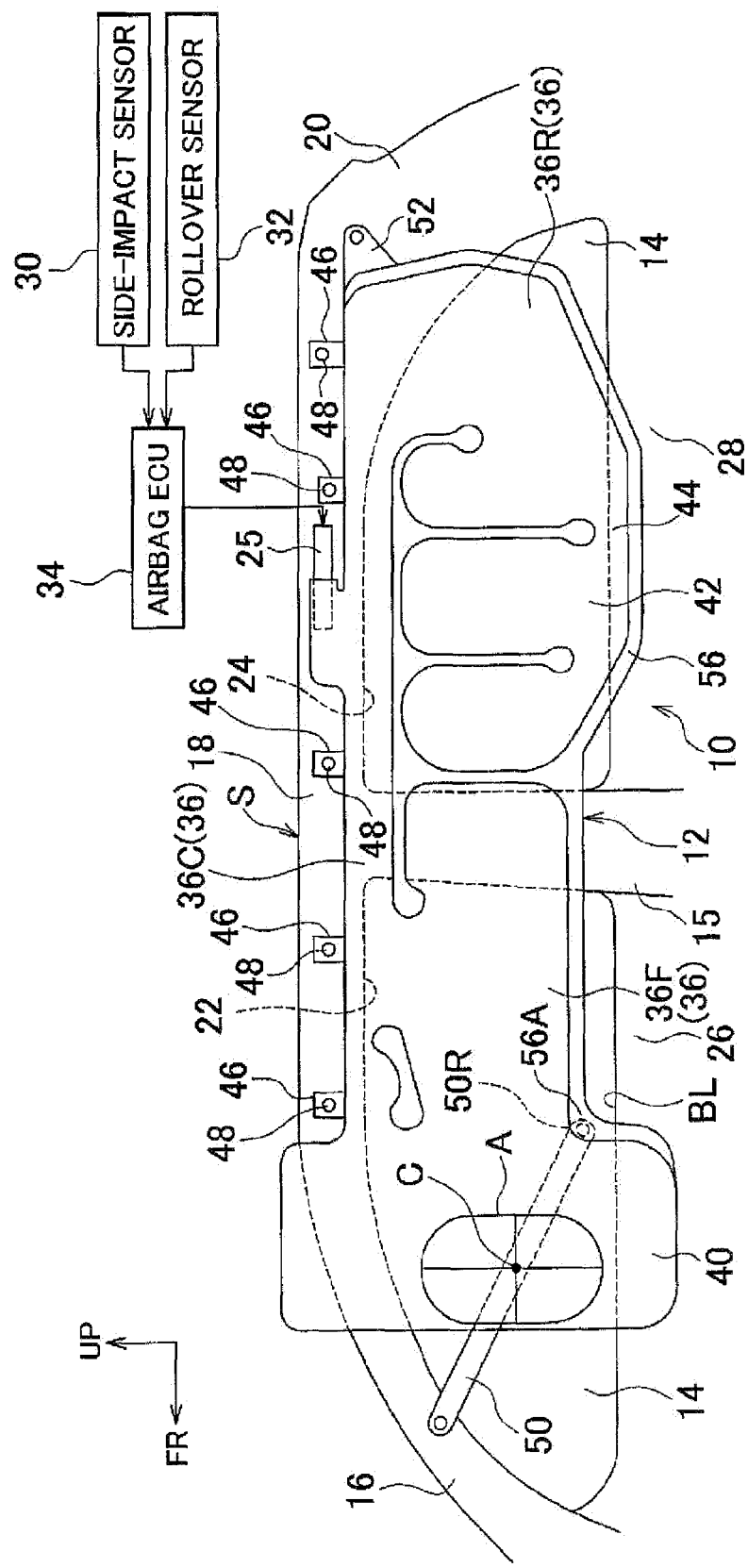
FIG. 1 is a side elevation view, as seen from the interior of a vehicle, schematically showing the overall construction of a curtain airbag system according to one embodiment of the invention.

FIG. 1 is a side elevation view showing the curtain airbag system 10 when viewed from the vehicle interior or compartment of the automobile S equipped with the system 10. As shown in FIG. 1, the curtain airbag system 10 includes a curtain airbag 12. The curtain airbag 12 is formed so as to be deployed like a curtain, along side windshields 14 as side parts of the vehicle interior, and a center pillar (or B pillar) 15. In this embodiment, the curtain airbag 12 is configured to cover the front and rear side windshields 14 located on one side of a front seat and a rear seat.

The curtain airbag 12 is rolled or accordion-folded into a cylindrical shape, as will be described later, and (then) stored along a roof side portion 18 until it comes close to a rear pillar 20. In certain cases as described later, the curtain airbag 12 is deployed along the front and rear side windshields 14 and the center pillar 15, as shown in FIG. 1, so as to protect the heads of occupants seated in the front seat and rear seat. In this embodiment, front and rear door openings 22, 24 serving as openings through which passengers are getting in or off are surrounded or defined by the roof side portion 18, front pillar 16, center pillar 15 and the rear pillar 20, and the roof side portion 18 forms upper edges of the front and rear door openings 22, 24. The curtain airbag 12 is stored between a roof side rail and a roof headlining which constitute the roof side portion 18.

The curtain airbag system 10 includes an inflator 25 as gas generating means for supplying gas into the curtain airbag 12. The inflator 25, which is of a combustion type or cold-gas type, is operated to generate gas, and supply the gas into the curtain airbag 12. A gas port of the inflator 25 communicates with the interior of the curtain airbag 12. In this embodiment, the inflator 25 is installed in the roof side portion 18. The shape of the deployed curtain airbag 12 and the location of the inflator 25 will be described later.

The curtain airbag 12 and the inflator 25 as described above are provided at each of the opposite sides of the automobile S as viewed in the vehicle width direction. Namely, the curtain airbag system 10 includes a pair of right and left curtain airbags 12, and a pair of inflators 25. Further, the curtain airbag system 10 includes an airbag ECU 34 electrically connected to a side impact sensor 30 and a rollover sensor 32. The side impact sensor 30 is configured to predict or detect a side impact of the automobile S (or its unavoidableness), and generate a side-impact detection signal to the airbag ECU 34. The rollover sensor 32 is configured to predict or detect rollover of the automobile S (or its unavoidableness), and generate a rollover detection signal (which will be called "R/O detection signal") to the airbag ECU 34.

The airbag ECU 34 is electrically connected to each of the right and left inflators 25. In FIG. 1, the airbag ECU 34 is connected to only one of the inflators 25. The airbag ECU 34 is configured to operate the inflator 25 on the side impact side (near side) when it receives a side-impact detection signal. Namely, when a side impact occurs to the automobile S, the curtain airbag 12 on the side-impact side is inflated with gas supplied thereto, and is deployed. The airbag ECU 34 is also configured to operate the inflator 25 on the opposite sides as viewed in the vehicle width direction, when it receives a R/O detection signal. When receiving a R/O detection signal after a side impact, the airbag ECU 34 is adapted to operate the inflator 25 opposite to the side-impact-side inflator 25 that has already been operated.

In the following, the construction of the curtain airbag 12 will be specifically described. Unless otherwise noted, the construction (shape) of the curtain airbag 12 that is in an inflated or deployed condition will be described. As shown in FIG. 1, the curtain airbag 12 includes a main chamber 36 as a first deployment portion, a front auxiliary chamber 40 as a second deployment portion that communicates with the main chamber 36, and a rear auxiliary chamber 42 that communicates with the main chamber 36.

The main chamber 36 is arranged to be inflated and deployed in a head protection area (mainly in the vanity of a rear portion of each of the side windshields 14 of the front and rear seats) in which the head of an occupant is to be protected against a side impact. More specifically, the main chamber 36 includes a front main chamber 36F for the front seat, a rear main chamber 36R for the rear seat, and a gas supply passage 36C through which gas is supplied to the front and rear main chambers 36F, 36R. The front main chamber 36F is arranged to be inflated and deployed in a region including a front-seat head protection area in which the head of an occupant is to be protected against a side impact. The front-seat head protection area for a side impact is located in the vicinity of a rear portion of the side windshield 14 of a front-side door 26. The rear main chamber 36R is arranged to be inflated and deployed in a region including a rear-seat head protection area in which the head of an occupant is to be protected against a side impact. The rear-seat head protection area for a side impact is located in the vicinity of a rear portion of the side windshield 14 of a rear-side door 28. The gas supply passage 36C extends along the roof side portion 18, and communicates with the front main chamber 36F and the rear main chamber 36R.

The above-mentioned inflator 25 is provided for supplying gas from a generally middle portion of the gas supply passage 36C. Namely, the inflator 25 is located between the front main chamber 36F as a front portion of the curtain airbag 12 and the rear main chamber 36R as a rear portion of the curtain airbag 12. The inflator 25 may also be mounted on the center pillar 15 or rear pillar 20 (C pillar or D pillar).

The front auxiliary chamber 40 is arranged to be deployed in front of the front main chamber 36F, to thus form a front-end portion of the curtain airbag 12, and serves to protect the head of a front-seat occupant at the front side of the front seat in a rollover event. When seen in a side view, an upper end portion of the front auxiliary chamber 40 overlaps the front pillar 16, and its lower end portion is located below the belt line BL and overlaps a front portion of the front side door 26 as a side door. In this embodiment, gas is supplied from the inflator 25 to the front auxiliary chamber 40, through a front end portion of the front main chamber 36F.

Region A denoted in FIG. 1 represents the most anterior test point which an impactor corresponding to the head of an occupant in a front seat strikes in a rollover test according to FMVSS No. 226 standard. The above-mentioned test point will also be called "impactor striking point" or "impact point". In the curtain airbag 12, the most anterior test point obtained in the above rollover test is covered by the front auxiliary chamber 40, and other test points for the front-seat occupant in the rollover test are covered by the front main chamber 36F.

The rear auxiliary chamber 42 is deployed in front of the rear main chamber 36R, to thus form a portion between the rear main chamber 36R and front main chamber 36F of the curtain airbag 12. In this embodiment, the rear auxiliary chamber 42 communicates at its lower end portion with a front lower portion of the rear main chamber 36R, via a gas passage 44. Furthermore, the rear auxiliary chamber 42 is linked (connected) at its upper end to a lower edge portion of the gas supply passage 36C, and is arranged to be deployed such that a lower end portion of the rear auxiliary chamber 42 overlaps a rear side door 28. The rear auxiliary chamber 42 serves to protect the head of a rear-seat occupant at the front side of the rear seat in a rollover event.

In this embodiment, the most anterior test point (impact point) which the impactor in the rear seat strikes in the above-mentioned rollover test is covered by the rear auxiliary chamber 42. The rearmost test point for the rear-scat occupant in the above rollover test is covered by the rear main chamber 36R.

As shown in FIG. 1, the curtain airbag 12 is provided with a plurality of mounting tabs 46 arranged along an upper edge of the curtain airbag 12. The mounting tabs 46 of the curtain airbag 12 are fixed to the vehicle body framework (including the front pillar 16, roof side portion 18, and the rear pillar 20), by means of fixtures 48, such as clips or bolts and nuts, which extend through the respective tabs 46. In this embodiment, the mounting tabs 46 are provided on the upper end of the main chamber 36, whereas the mounting tabs 46 are not provided on the front auxiliary chamber 40 that is folded as described later, and the rear auxiliary chamber 42 whose upper edge is linked to the gas supply passage 36C.

A front portion of the curtain airbag 12 as described above is supported by the front pillar 16 via a strap 50. Also, the rear end of the curtain airbag 12, or the rear main chamber 36R, is supported by the rear pillar 20 via a support cloth 52.

In the curtain airbag 12, a surface of a foundation cloth that forms at least the front auxiliary chamber 40 is subjected to weave texture sealing, such as silicon coating, so that the internal pressure of the chamber 40 is likely to be maintained. In this embodiment, silicon coating is applied to surfaces of foundation cloths that form the front auxiliary chamber 40 and the rear auxiliary chamber 42.

As described above, when seen in a side view, the upper end portion of the front auxiliary chamber 40 overlaps the front pillar 16, and its lower end portion is located below the belt line BL and overlaps the front portion of the front side door 26. Therefore, the curtain airbag 12 is deployed in the shape of letter "T" lying on its side, such that the front auxiliary chamber 40 protrudes upward and downward relative to the main chamber 36. While the deployed curtain airbag 12 as shown in FIG. 1 is shaped such that the upper portion of the front auxiliary chamber 40 extends beyond the front pillar 16, the shape schematically shown in FIG. 1 is that of the curtain airbag 12 alone (when it is not installed on the vehicle).

As shown in FIG. 2A, the front auxiliary chamber 40 is deployed in a vertically long, generally cylindrical shape whose center axis extends in the vertical direction. FIG. 2A schematically illustrates a condition where the upper portion of the front auxiliary chamber 40 interferes with the front pillar 16 (front windshield 38).

Figures 3A, 3B:
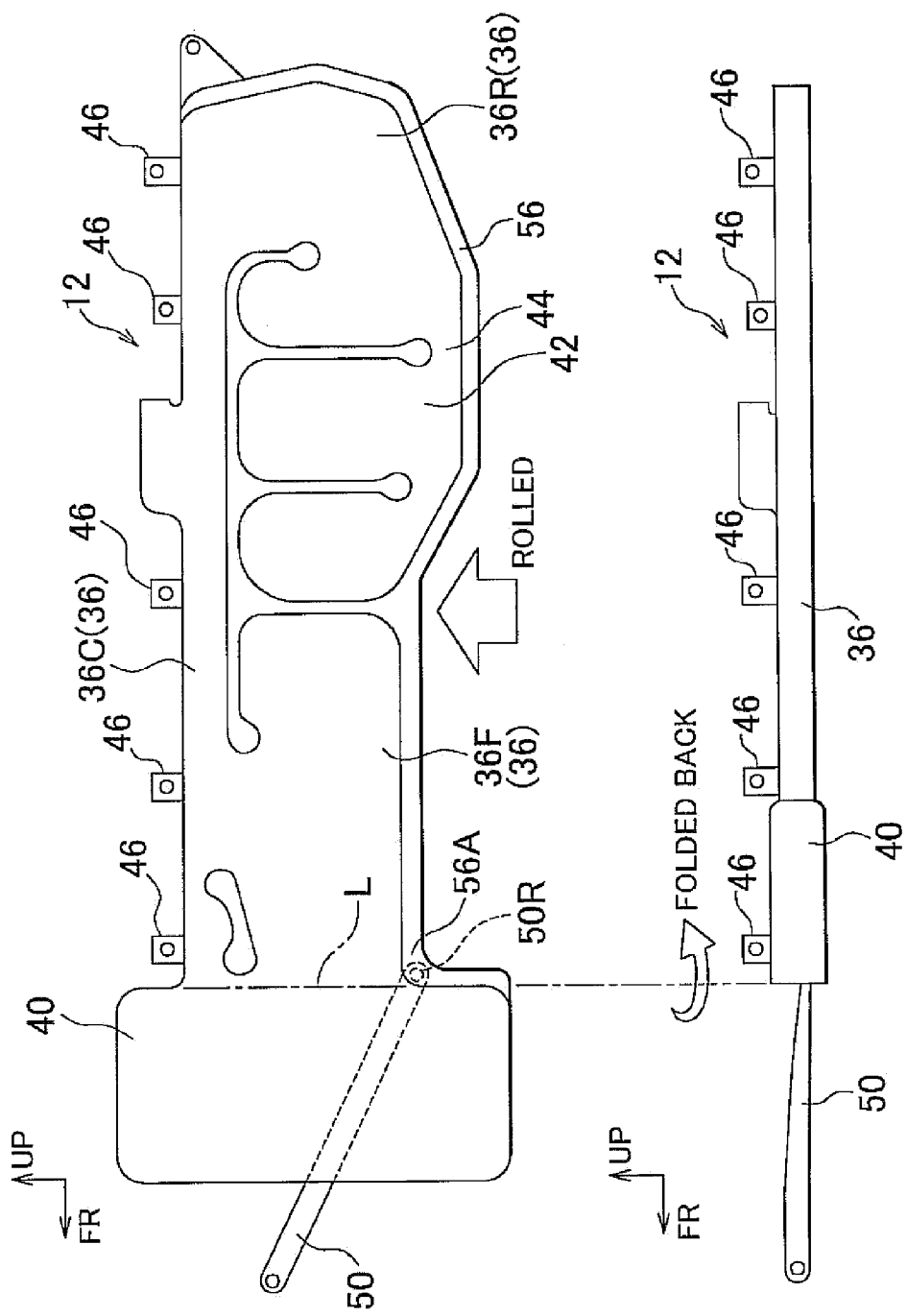
FIG. 3A is a side elevation view showing a flat pattern of a curtain airbag that constitutes the curtain airbag system according to the embodiment of the invention.
FIG. 3B is a side view showing a folded state of the curtain airbag that constitutes the curtain airbag system according to the embodiment of the invention.
Figure 4:
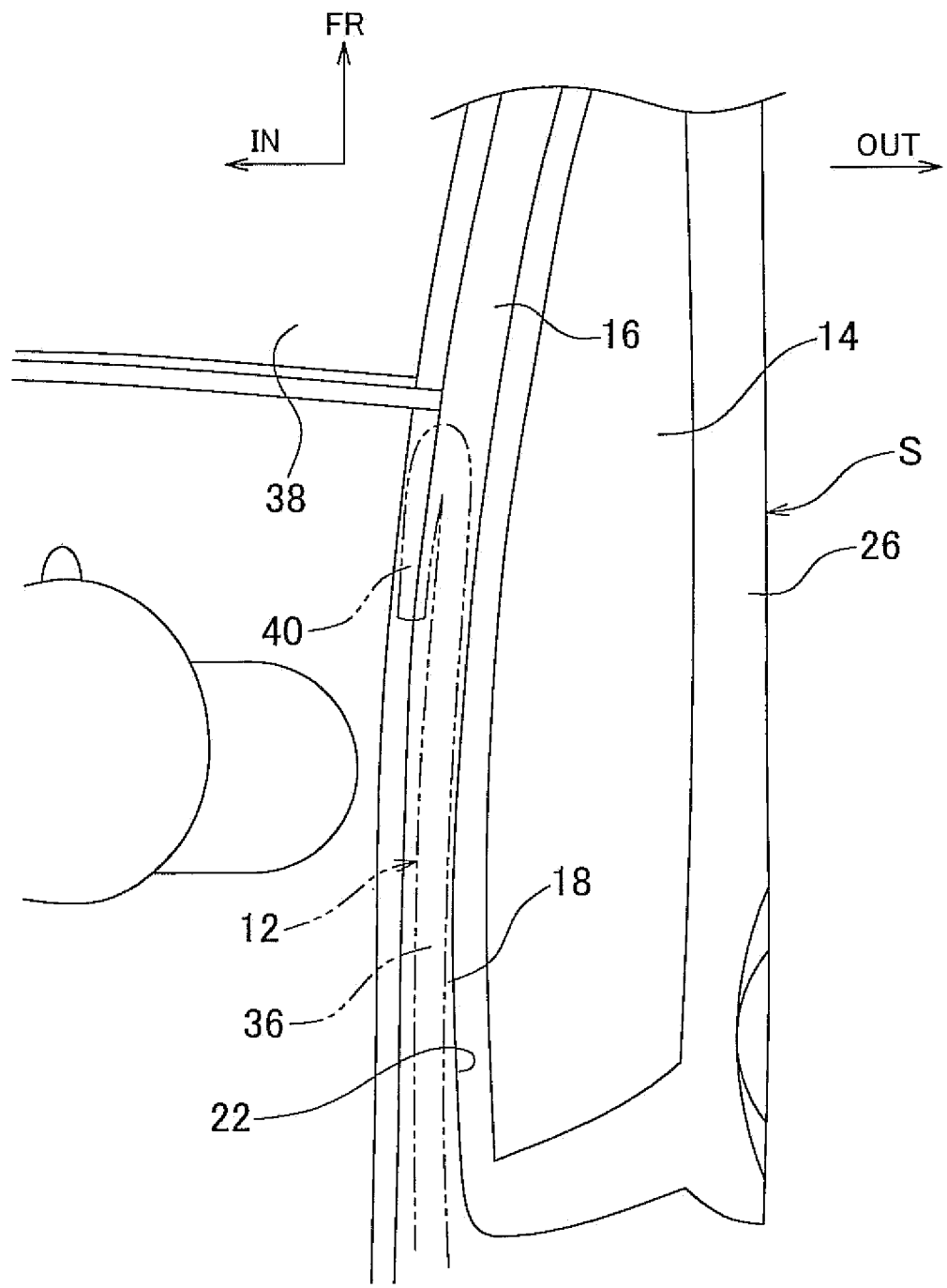
FIG. 4 is a plan view showing a part of an automobile in which the curtain airbag system according to the embodiment of the invention is used.

The front auxiliary chamber 40 as described above is stored along with the main chamber 36 in the roof side portion 18, namely, between the roof side rail as a part of the vehicle body framework and an end portion (as viewed in the vehicle width direction) of the roof headlining as a ceiling material. More specifically, as shown in FIG. 3A, the curtain airbag 12 is rolled (or accordion-folded) in the vertical direction, from a flat pattern (the planar shape of the curtain airbag when it is in a non-inflated, deployed condition), and the front auxiliary chamber 40 is folded back onto the main chamber 36, at a portion corresponding to a return line L. The folded front auxiliary chamber 40 is located, for example, below the main chamber 36 or inside the main chamber 36 as viewed in the vehicle width direction. FIG. 3B and FIG. 4 illustrate a condition where the front auxiliary chamber 40 is folded back inwardly as viewed in the vehicle width direction.

The curtain airbag 12 that is in the above folded condition is stored in the roof side portion 18, as described above. The front auxiliary chamber 40, which is stored in the roof side portion 18 in the above-described folded condition and is to be deployed in front of the roof side portion 18, is provided with no mounting tab 46 for connection with the front pillar 16 as described above.

As shown in FIG. 1, in the curtain airbag system 10, the strap 50 is linked at its rear end 50R to a boundary between the main chamber 36 and the front auxiliary chamber 40 or its vicinity. More specifically, a thickness restricting portion 56 as an uninflatable portion for restricting the thickness of deployment is provided around the curtain bag 12 and at boundary portions of its respective deployment portions. The rear end 50R of the strap 50 is linked to a part of the restricting portion 56 between the front main chamber 36F and the front auxiliary chamber 40, more specifically, a corner portion 56A where the front auxiliary chamber 40 protrudes downward from a front, lower end portion of the front main chamber 36F.

The strap 50 is arranged to extend through the outer side (in the vehicle width direction) of the deployed front auxiliary chamber 40, as seen in a side view. Also, the strap 50 is arranged to pass the region A (in this embodiment, the center C of the region A) as an impactor striking point in the front auxiliary chamber 40, as seen in the side view. In this embodiment, the strap 50 is set to pass the impactor striking point as seen in the side view, in the position (shape of deployment) of the front auxiliary chamber 40 in the case where the impactor protrudes about 100 mm from the side windshield 14.

The strap 50 is stored between the front pillar 16 and a pillar garnish 58 (see FIG. 2A), and is adapted to deployed into the interior of the vehicle through a clearance between the front pillar 16 and the pillar garnish 58 as the curtain airbag 12 is deployed. Any member to which tension is applied between the front pillar 16 and a front end portion of the main chamber 36 during deployment of the curtain airbag 12 may suffice as the strap 50, and the shape of the strap 50 is not limited to a fixed-width elongate shape, such as a belt-like shape, but the shape and material of the strap 50 may be selected from various shapes, dimensions, and materials.

Next, the operation of the first embodiment will be described.

In the curtain airbag system 10 constructed as described above, when a side impact occurs to the automobile S equipped with the airbag system 10, the airbag ECU 34 receives a side-impact detection signal from the side-impact sensor 30, and operates the inflator 25 on the side on which the side impact occurred. As a result, the curtain airbag 12 is inflated with gas supplied from the inflator 25, and the main chamber 36, i.e., the front main chamber 36F and the rear main chamber 36R, of the curtain airbag 12 is deployed. In this manner, the head of an occupant seated in the front seat on the side-impact side is protected by the front main chamber 36F, and the head of an occupant seated in the rear seat on the side-impact side is protected by the rear main chamber 36R.

On the side-impact side of the vehicle, the front auxiliary chamber 40 and the rear auxiliary chamber 42 of the curtain airbag 12 are also deployed, for preparation for occupant protection against rollover. Therefore, if rollover occurs to the automobile S, following the side impact, the airbag ECU 34 receives a R/O detection signal from the rollover sensor 32, and operates the inflator 25 on the side opposite to the side-impact side. If, on the other hand, rollover occurs to the automobile S, independently of a side impact, the airbag ECU 34, which receives a R/O detection signal from the rollover sensor 32, operates the inflators 25 on the right-hand and left-hand sides of the vehicle.

Consequently, the curtain airbags 12 are deployed as a whole on the opposite sides as viewed in the vehicle width direction, so that the head of each occupant is protected against rollover. Namely, the displacement of the head of the occupant in the vehicle width direction is restricted or suppressed at each of longitudinally arranged portions of the vehicle.

The curtain airbag system 10, in which the front auxiliary chamber 40 is stored in the roof side portion 18, can be suitably used in the automobile S having small-width front pillars 16, as compared with a comparative example in which a front auxiliary chamber 102 is stored in a front pillar 100, as shown in FIG. 2B.

The front auxiliary chamber 40 is deployed while overlapping the front pillar 16 and the front side door 26 as seen in a side view. Therefore, the reaction force produced at the front auxiliary chamber 40 when it restricts outward movement of the head of the occupant in the vehicle width direction is securely supported by the front pillar 16 and the front side door 26.

With the above arrangement, the front auxiliary chamber 40, which is stored in the roof side portion 18 and is not fixed at its upper end to the front pillar 16 (has no mounting tab 46), assures the protection capability of protecting the head of an occupant against an impact caused by rollover of the vehicle. In particular, since the front auxiliary chamber 40 assumes a cylindrical shape whose center axis extends in the vertical direction, the above-mentioned reaction force is effectively supported due to its interference with the front pillar 16 and the front side door 26, and the occupant's head protection capability is improved.

Thus, the curtain airbag system 10 according to this embodiment of the invention is suitably used in the automobile S having narrow front pillars 16, while assuring improved occupant protection capability in a rollover event.

Namely, as compared with a comparative example including a front auxiliary chamber whose upper end portion does not overlap the front pillar 16 when deployed, for example, the curtain airbag system 10 of this embodiment can significantly restrict the movement of the head of the occupant in the vehicle width direction. In the meantime, a comparative example as shown in FIG. 2B includes a front auxiliary chamber 102 joined at its upper end to a front pillar 100, and assures required occupant protection capability. In this comparative example, however, the width or thickness of the front pillar 100 (including the pillar garnish 104) in which the front auxiliary chamber 102 is stored is larger than that of the front pillar 16 (including the pillar garnish 58). Thus, the curtain airbag system 10 lends itself to reduction of the width of the front pillar 16, namely, improvement of the visibility, and assures substantially the same occupant protection capability, as compared with the above comparative example.

Also, in the curtain airbag system 10, tension is applied to the strap 50 when the curtain airbag 12 is in a deployed condition. Since the strap 50 extends through the outer side of the front auxiliary chamber 40, a part of the reaction force produced when the front auxiliary chamber 40 restricts outward movement of the head of the occupant in the vehicle width direction is also supported by the strap 50. Therefore, the outward movement of the front auxiliary chamber 40, or the head of the occupant, in the vehicle width direction is effectively restricted by the strap 50. Furthermore, since the strap 50 is arranged to pass the center C of the region A as the impactor striking point (impact point), the outward movement of the front auxiliary chamber 40, or the head of the occupant (impactor), in the vehicle width direction is further effectively restricted by the strap 50.

While the front auxiliary chamber 40 and the rear auxiliary chamber 42 are deployed along with the main chamber 36 in the illustrated embodiment, the present invention is not limited to this arrangement. For example, at least a part of the front auxiliary chamber 40 and the rear auxiliary chamber 42 may be constructed as a delayed deployment portion (delay chamber) that is deployed later than the main chamber 36. Namely, by using a difference between the time (1.5 sec. to 6 sec. after a side impact) at which protection against rollover is required and the time (immediately after a side impact) at which protection against the side impact is required, the main chamber 36 may be arranged to be deployed in a short time, earlier than or ahead of the front auxiliary chamber 40 and the rear auxiliary chamber 42, and at least a part of the front auxiliary chamber 40 and the rear auxiliary chamber 42 may be arranged to be deployed by the time when protection against rollover is required. The delay chamber may be formed, for example, by providing a restrictor channel having the inside diameter of 40 mm to 70 mm, which allows gas to flow therethrough, between the delay chamber and the main chamber 36.

While the strap 50 is obliquely deployed in the illustrated embodiment, the invention is not limited to this configuration, but the strap 50 may be arranged to be deployed in a horizontal direction. For example, in the arrangement in which the front auxiliary chamber 40 is formed as the above-mentioned delay chamber, an uninflatable portion is provided around the restrictor channel, and it is therefore easy to provide a strap that passes the impactor striking point and connects the uninflatable portion with the front pillar 16 in a horizontal direction.

While the present invention is applied to the automobile S having the rear seats and the rear side doors 28 in the illustrated embodiment, the invention is not limited to this application. For example, the invention may be applied to automobiles, such as a two-door automobile having no rear side door 28, two-seater automobile having no rear seat, and an automobile having three or more rows of seats.

While the curtain airbag 12 is rolled in the vertical direction, and then the front auxiliary chamber 40 is folded back onto the main chamber 36 in the illustrated embodiment, the invention is not limited to this arrangement. For example, the curtain airbag 12 may be rolled or accordion-folded in the vertical direction, after the front auxiliary chamber 40 in a flat pattern is folded back onto the main chamber 36 at a portion corresponding to the return line L.

Needless to say, the invention may be otherwise embodied with various modifications, without departing from the principle of the invention.

What is claimed is:

1. A curtain airbag system for a vehicle, comprising
   a curtain airbag stored in a folded condition in a roof side portion that extends rearward from a front pillar of the vehicle, the curtain airbag includes a first deployment portion and a second deployment portion formed integrally with the first deployment portion,
   the first deployment portion operable to be inflated with gas supplied thereto in the event of a side impact of the vehicle and rollover of the vehicle, the first deployment portion deployed like a curtain downwardly of the vehicle,
   the second deployment portion operable to be inflated with gas supplied thereto at least in the event of rollover of the vehicle, the second deployment portion deployed in front of the first deployment portion such that an upper portion of the second deployment portion, as seen in a side view, overlaps the front pillar, and a lower portion of the second deployment portion overlaps a side door of the vehicle,
   the second deployment portion is adapted to be deployed in a cylindrical shape having a center axis that extends in a vertical direction of the vehicle, such that opposite end portions of the second deployment portion, as viewed in the vertical direction of the vehicle, respectively, protrude upward and downward from opposite end portions of the first deployment portion, as viewed in the vertical direction of the vehicle.

2. The curtain airbag system according to claim 1, wherein the second deployment portion is rolled or accordion-folded in a vertical direction together with the first deployment portion, and is folded back onto the first deployment portion.

3. The curtain airbag system according to claim 2, wherein a return line along which the second deployment portion is folded back is located posterior to a rear end of the front pillar.

4. The curtain airbag system according to claim 1, further comprising:
   a thickness restricting portion that is provided between the first deployment portion and the second deployment portion, so as to restrict the thickness of the first deployment portion and the second deployment portion when deployed; and
   a strap having a front end engaged with the front pillar and a rear end connected to the thickness restricting portion, the strap being adapted to extend through an outer side, as viewed in a vehicle width direction, of the second deployment portion when deployed.

5. The curtain airbag system according to claim 4, wherein the front end of the strap is engaged with the front pillar while the rear end thereof is connected to the thickness restricting portion, such that the strap extends through an outer side, as viewed in the vehicle width direction, of an impactor striking point of a rollover test in the second deployment portion.

6. The curtain airbag system according to claim 5, wherein the strap is arranged to extend through the center of an impactor striking point as seen in the side view.

7. The curtain airbag system according to claim 1, wherein the first deployment portion is provided with a mounting tab that fixes the curtain airbag to a vehicle body framework, and the second deployment portion is provided with no mounting tab.

8. The curtain airbag system according to claim 1, wherein at least a part of the second deployment portion is deployed later than deployment of the first deployment portion in the event of rollover of the vehicle.

9. The curtain airbag system according to claim 1, wherein the first deployment portion is the front main chamber that serves to protect the head of a front-seat occupant, and the second deployment portion is the front auxiliary chamber that communicates with the front main chamber.

10. The curtain airbag system according to claim 1, further comprising:
    a rear main chamber that serves to protect the head of a rear-seat occupant; and
    a rear auxiliary chamber that communicates with the rear main chamber, wherein the rear auxiliary chamber is deployed so that a lower portion of the rear auxiliary chamber overlaps the side door as seen in a side view.

* * * * *